US 6,715,817 B2

(12) United States Patent
Nolan et al.

(10) Patent No.: US 6,715,817 B2
(45) Date of Patent: Apr. 6, 2004

(54) END CAP FOR ROLL TARP SYSTEM

(75) Inventors: Robert Nolan, Omaha, NE (US); James R. Tuerk, Indianapolis, IN (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 10/037,217

(22) Filed: Nov. 9, 2001

(65) Prior Publication Data

US 2003/0090124 A1 May 15, 2003

(51) Int. Cl.[7] .................................................. B60P 7/04
(52) U.S. Cl. ................ 296/100.12; 296/98; 296/100.11
(58) Field of Search .............................. 296/98, 100.01, 296/100.11, 100.12, 100.15, 100.16, 100.17

(56) References Cited

U.S. PATENT DOCUMENTS

| 3,423,126 A | * | 1/1969 | Galvin et al. ................. 296/98 |
| 3,942,830 A | * | 3/1976 | Woodard ..................... 296/105 |
| 4,302,043 A | | 11/1981 | Dimmer et al. ............... 296/98 |
| RE31,746 E | | 11/1984 | Dimmer et al. ............... 296/98 |
| 4,484,777 A | * | 11/1984 | Michel ......................... 296/98 |
| 4,505,512 A | | 3/1985 | Schmeichel et al. .......... 296/98 |
| 4,518,193 A | * | 5/1985 | Heider et al. ................. 296/98 |
| 4,529,098 A | * | 7/1985 | Heider et al. ................ 220/211 |
| 4,691,957 A | * | 9/1987 | Ellingson ..................... 296/98 |
| 5,002,328 A | | 3/1991 | Michel ......................... 296/98 |
| 5,050,923 A | * | 9/1991 | Petelka ........................ 296/98 |
| 5,180,203 A | * | 1/1993 | Goudy ......................... 296/98 |
| 5,186,231 A | * | 2/1993 | Lewis .......................... 160/310 |
| 5,429,403 A | * | 7/1995 | Brasher ........................ 296/32 |
| 5,765,901 A | * | 6/1998 | Wilkens ....................... 296/98 |
| 5,873,210 A | * | 2/1999 | Brumleve .................... 52/735.1 |
| 5,924,758 A | | 7/1999 | Dimmer et al. ............... 296/98 |
| 5,984,379 A | | 11/1999 | Michel et al. ............ 296/100.16 |
| 6,513,856 B1 | * | 2/2003 | Swanson et al. .............. 296/98 |
| 2003/0090124 A1 | * | 5/2003 | Nolan et al. .................. 296/98 |

OTHER PUBLICATIONS

*Easy Cover Tarping System*, Easy Cover booklet, AERO Industries, Inc., pp. 1–4.

* cited by examiner

*Primary Examiner*—D. Glenn Dayoan
*Assistant Examiner*—Paul Chenevert
(74) *Attorney, Agent, or Firm*—Maginot, Moore & Beck

(57) ABSTRACT

A one-piece molded end cap is provided for use with a container tarping system. The end cap is in the form of an aerodynamically shaped shell and includes a trough and ridge configuration at the rear edge to provide a sealing surface for the side edge of the flexible cover of the tarping system. A deflection barrier is formed at the underside of the end cap shell and is configured to deflect material loaded into the container away from the end cap. In a further embodiment, the end cap can include a tensioning mechanism integral with a front edge of the end cap. The tensioning mechanism includes an elongated body having a bore within which a tensioning element is disposed. The tensioning element applies tension to a drive mechanism of the tarping system through a cable.

16 Claims, 4 Drawing Sheets

END CAP FOR ROLL TARP SYSTEM

BACKGROUND OF THE INVENTION

The present invention relates to tarping systems for open-topped containers, such as trailers on hauling vehicles. The invention pertains to improvements in roll tarp systems, and more particularly to end caps for use with such systems.

Various types of truck, trailers and container bodies are designed to be loaded and unloaded through an open top. A typical application of such containers is to haul grain, earth or refuse. It is obviously desirable to provide the container with a covering, such as a flexible tarpaulin, to close the open top and prevent discharge of the materials housed therein during transit. The tarpaulins, or tarps, also serve to shelter the container contents from the elements, such as wind and rain.

Several systems have been developed for covering open-topped containers. Most frequently, these systems involve a flexible tarp unrolled from a tube that spans a length or width dimension of the container. These systems also frequently use curved bows spanning a dimension of the container to provide support for the flexible tarp when it has been unfurled over the loaded container.

Two such tarping systems are the SIDEWINDER™ Tarp System and the KWIK-LOCK™ Roll Tarp manufactured and sold by Aero Industries, Inc. Both systems are adapted for use on long trailers. For the purposes of illustration, reference is made to FIGS. 1 and 2 in which general features of these tarping systems are depicted. Further details of these tarping systems can be found in U.S. Pat. No. 5,002,328 to Michel, and Re. No. 31,746 to Dimmer et al., the disclosures of which are incorporated herein by reference. As shown in FIG. 1, a roll tarp assembly 10 is mounted on a trailer 12. The assembly includes a flexible cover or tarpaulin 16 that is sized to cover the trailer opening 14 when it is unrolled.

The tarp 16 is rolled onto one side wall 18 of the trailer 12 and supported by a retainer assembly 20. Details of this retainer assembly can be found in the above-mentioned patent to Dimmer et al. The tarp 16 is wound onto a roll tube 22. Like the tarp 16, the roll tube has a length sized to span the length of the trailer 12. Preferably, the roll tube 22 is a rigid metal tube, usually made of aluminum.

The roll tube 22 is rotated by way of a hand crank 25 that drives a crank shaft 26. Rotation of the shaft 26 leads to rotation of the roll tube 22 through a universal joint 27. A crank retainer assembly 28 can be provided to store the crank when not in use. Again, this crank mechanism can be of conventional design, such as the mechanism disclosed in the Dimmer '746 reissue patent.

In the tarping system 10 illustrated in FIGS. 1 and 2, the tarp is unrolled from its rolled configuration 16' to its extended position 16 over the container opening 14. Tarp bows 32 help support the weight of the tarp when it is drawn across the width of the trailer from side wall to side wall 18. The free end of the tarp can be held in place by a latch plate 30. The details of this latch plate can again be found in the Dimmer '746 patent, which disclosure is incorporated herein by reference. However, it is understood that other tarp retaining devices can be utilized.

In prior tarping systems, a pair of end cap plates 35 are provided at opposite ends of the container or trailer 12. These end cap plates help support the roll tube 22 and tarp as it is rolled and unrolled. In addition, the plates 35 provide a sealing surface as the tarp 16 is drawn and tightened across the plates 35 in its unrolled configuration. Tension in the tarp 16 pull the tarp edges onto the plates 35 to help prevent flapping during transit and to help protect the trailer contents from the elements. A wind deflector 36 can be provided at the front end of the trailer to provide further isolation of the tarp from the elements.

One detriment with the end cap plates of these prior tarping systems is that transported material has a tendency to collect under the plates. Other end caps have been provided that are somewhat more contoured fore and aft. These contoured end caps can be even more problematic since they encompass a large volume and therefore provide more space for material to collect. The material, such as grain or refuse, amassed beneath the end cap eventually degrades and can foul the end cap and even cause it to corrode. Of course, damage to the end cap compromises its ability to support the tarp and maintain a tight seal against the elements. Eventually, the end cap plate or end cap must be replaced.

SUMMARY OF THE INVENTION

In order to address these and other difficulties and shortcomings of prior tarping systems, the present invention contemplates and end cap for a roll tarp system that is a molded, non-metallic component. In one aspect, the end cap is a one-piece aerodynamically shaped shell sized to fit over an end of the container covered by the roll tarp system. In a further aspect, the end cap includes a curved front panel that defines a trough and ridge configuration adjacent the rear edge of the panel. The trough and ridge cooperate to provide a sealing surface for the side edge of the flexible cover of the tarping system when it is extended over the container.

The end cap is preferably hollow in shape to reduce material requirements and component weight. The front panel can include a number of stiffening indentations formed therein to add strength and resistance to bending, buckling and twisting.

In another feature of the invention, the end cap includes a deflection barrier formed at the underside of the end cap shell. The deflection barrier is configured to deflect material loaded into the container away from the end cap and into the body of the container. Preferably, the deflection barrier is a box-like structure so that it can be easily formed in a molding process. Moreover, the box-like structure adds strength and stiffness to the overall end cap. Stiffening indentations can be provided in the deflection barrier to provide further stiffness.

In a further embodiment, the end cap can include a tensioning mechanism integral with a front edge of the end cap. The end cap of this embodiment is particularly suited for use with motor-driven tarping systems. The tensioning mechanism includes an elongated body defining a bore therein. The bore is sized to contain a tensioning element, which applies tension to a drive mechanism of the tarping system through a cable.

The elongated body is preferably integrally formed with the end cap at its front edge. The end cap and integral tensioning mechanism can then be mounted onto one end of the container with the elongated body of the tensioning element overhanging the top rail of the container.

In one aspect of this embodiment, the bore in the elongated body opens outboard so that the tensioning cable passes across the elongated body. Preferably, the body defines a contoured edge at the open end of the bore against which the cable slides as the cable is tensioned and released with the deployment of the flexible cover.

One object of the present invention is to provide an end cap for a roll tarping system that is lighter in weight and easier to install than prior end caps. A further object is achieved by features of the inventive end cap that prevent the build-up of corrosive material at the end cap.

Another object of the invention resides in integrating a tensioning mechanism for a motor-driven tarping system with an end cap to reduce the number of separate components that must be installed. Other objects and benefits can be discerned from the following written description and accompanying figures.

DESCRIPTION OF THE PREFERRED EMBODIMENTS

Figure 1:
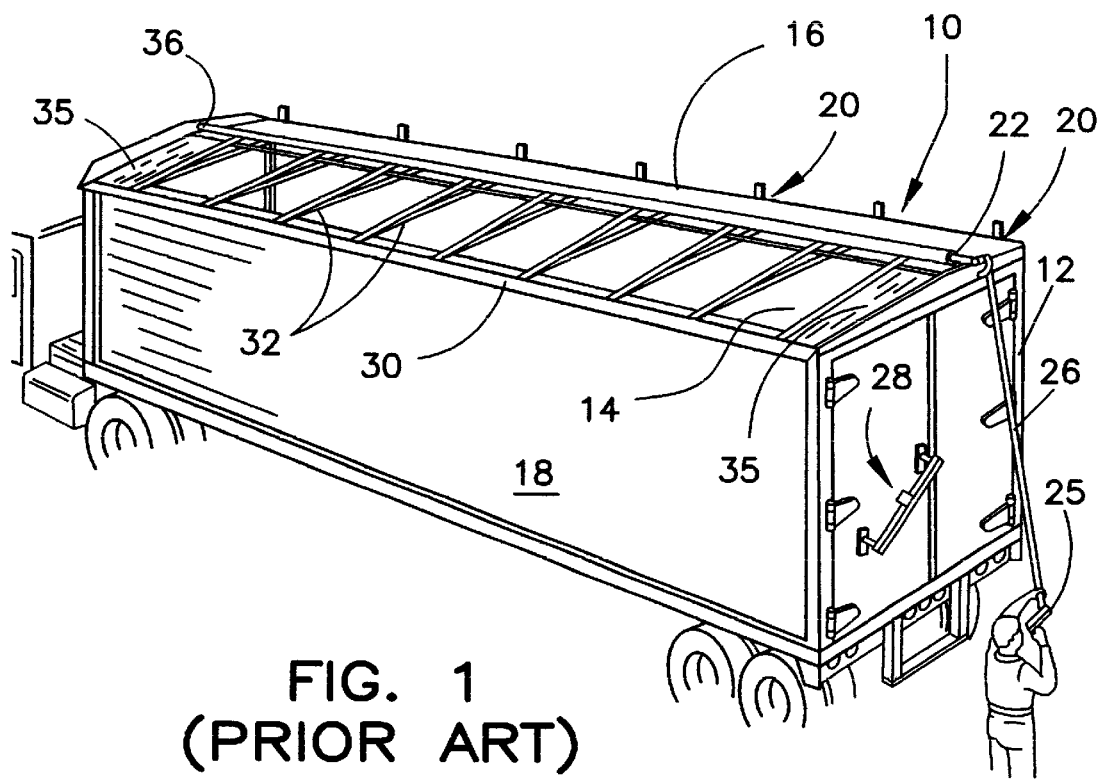
FIG. 1 is a perspective view of a trailer including a roll tarping system of the prior art.

For the purposes of promoting an understanding of the principles of the invention, reference will now be made to the embodiment illustrated in the drawings and specific language will be used to describe the same. It will nevertheless be understood that no limitation of the scope of the invention is thereby intended. The invention includes any alterations and further modifications in the illustrated tools and further applications of the principles of the invention, which would normally occur to one skilled in the art to which the invention relates.

Figure 2:
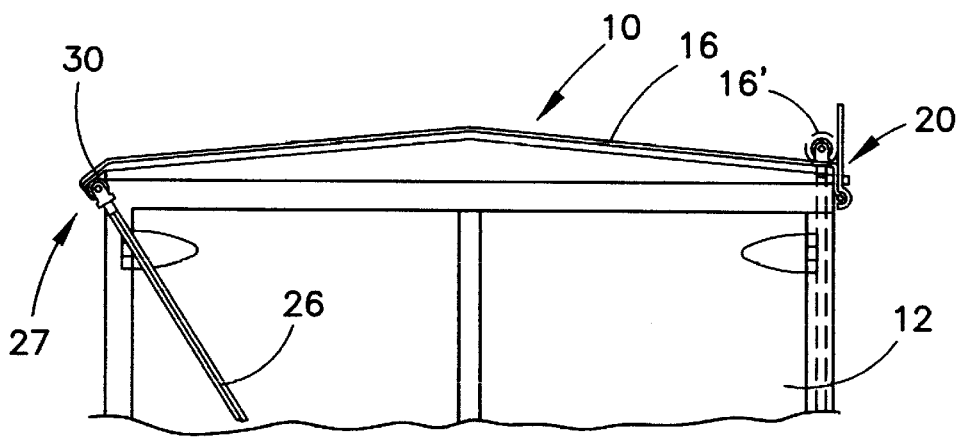
FIG. 2 is a rear elevational view of the trailer and tarping system depicted in FIG. 1.
Figure 3:
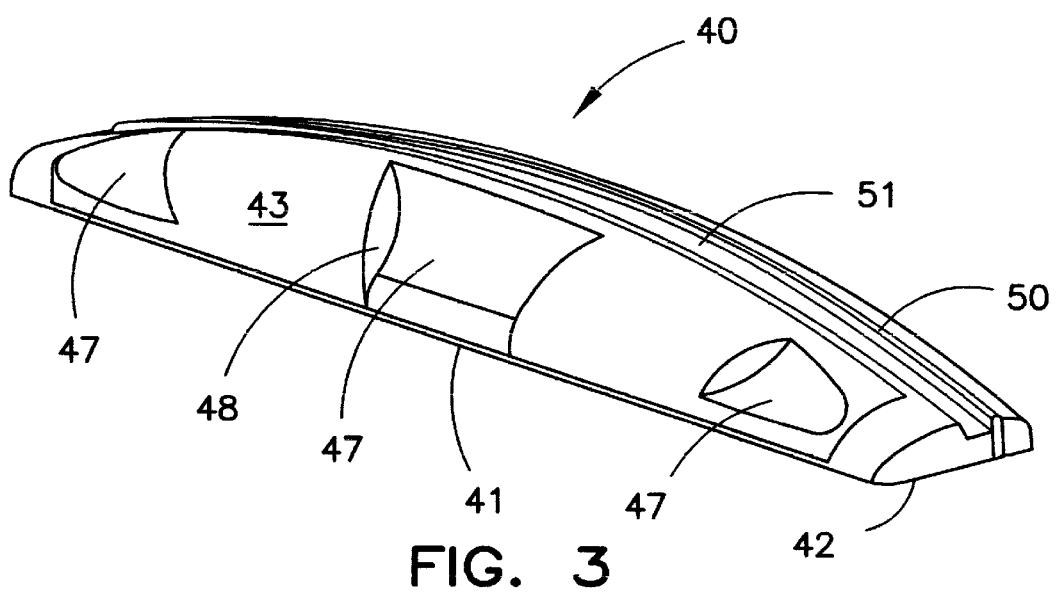
FIG. 3 is a front perspective view of an end cap in accordance with one embodiment of the present invention for use with a roll tarping system.

In accordance with the present invention, a novel end cap is provided for use with a roll tarping system, such as the system 10 illustrated in FIGS. 1 and 2. In particular, the inventive end cap can replace the end cap plates 35 depicted in FIG. 1. Thus, as shown in FIG. 3, an end cap 40 is provided that is of one-piece construction. Preferably, the end cap 40 is molded from a strong, durable plastic or fiberglass material that is capable of weathering the elements and withstanding physical abuse that might occur during normal use. The end cap and its material must also be rigid enough to provide a solid support for the tarp 16 as it is unrolled over the trailer opening 14.

The end cap 40 includes a front edge 41 and side edges 42 that are sized to mate with the top rail of the container or trailer 12. Most preferably, the front and side edges 41, 42 fall in a common plane and sit flush with the top rail. In the preferred embodiment, the front and side edges can be provided with blind threaded bores (not shown), evenly spaced around the perimeter of the end cap. The threaded bores can be configured to receive bolts or fasteners that pass through corresponding through-bores in the container top rail in a known manner. Alternatively, the front and side edges 41, 42 can be provided with through holes to accept nut and bolt fasteners to mount the end cap to the top rail. As a further alternative, the edges 41, 42 can be fastened to the top rail by a series of brackets or clamps, the design of which will be apparent to a person of skill in this art.

The end cap 40 of the present invention includes a contoured or curved front panel 43 so the end cap is in the form of a partial shell. The curved surface of the wall 43 makes the end cap more aerodynamic and helps produce laminar air flow over the tarp to reduce buffeting of the tarp side edges that might result from over-the-road hauling of the trailer. In order to add strength and stiffness to the end cap, a number of recesses or indentations 47 can be formed in the curved front panel 43. The indentations 47 define stiffening walls 48 that project transverse to the front surface, thereby adding bending stiffness to the surface. The indentations 47 and walls 48 help the end cap 40 resist bending, twisting about its length and buckling under an impact load, as might occur during loading of the trailer.

The end cap 40 further defines a tarp sealing ridge 50 and an adjacent sealing channel or trough 51 in its upper surface. The trough 51 is outboard of the ridge 50 relative to the location of the tarp. More specifically, the ridge 50 and trough 51 are arranged so that a side edge of the tarp 16 is disposed within the trough 51 as the tarp is extended across the end cap 40. As is known, with typical tarping systems, the tarp is placed in tension when it is fully deployed across the container/trailer opening 14. This tensioning can be accomplished in a manner described in the Dimmer '746 reissue patent, incorporated by reference above. When the tarp is in tension, the side edge of the tarp tends to draw into the trough 51. The ridge 50 provides additional tension for the portion of the tarp traversing the ridge, so that the combination of trough and ridge form a tight seal at the side edge of the tarp. The additional tension created by the ridge 50 also helps resist flapping or buffeting of the tarp at highway traveling speeds. In a specific embodiment, the ridge 50 is inset from the rear edge 53 about 2.0 inches, and is upstanding from the surface of the front panel 43 about 1.0 inches. The channel or trough 51 is preferably immediately outboard of the ridge 50 and can share a common surface therewith. The trough 51 is sufficiently deep to receive a side edge of the tarp, and preferably has a depth of about 1.0 inches below the surface of the front panel and a width of about 2.0 inches.

Figure 4:
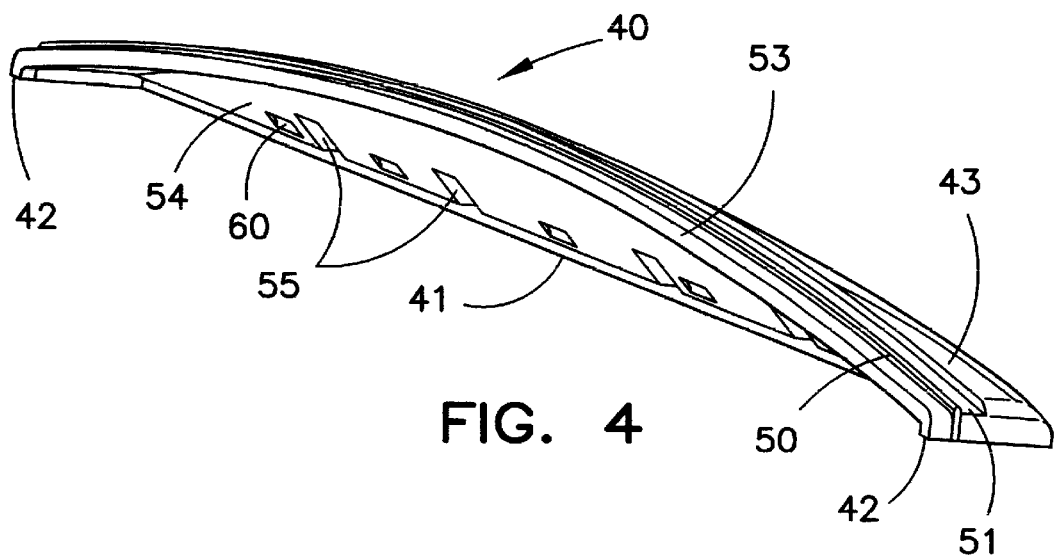
FIG. 4 is a rear perspective view of the end cap depicted in FIG. 3.
Figure 5:
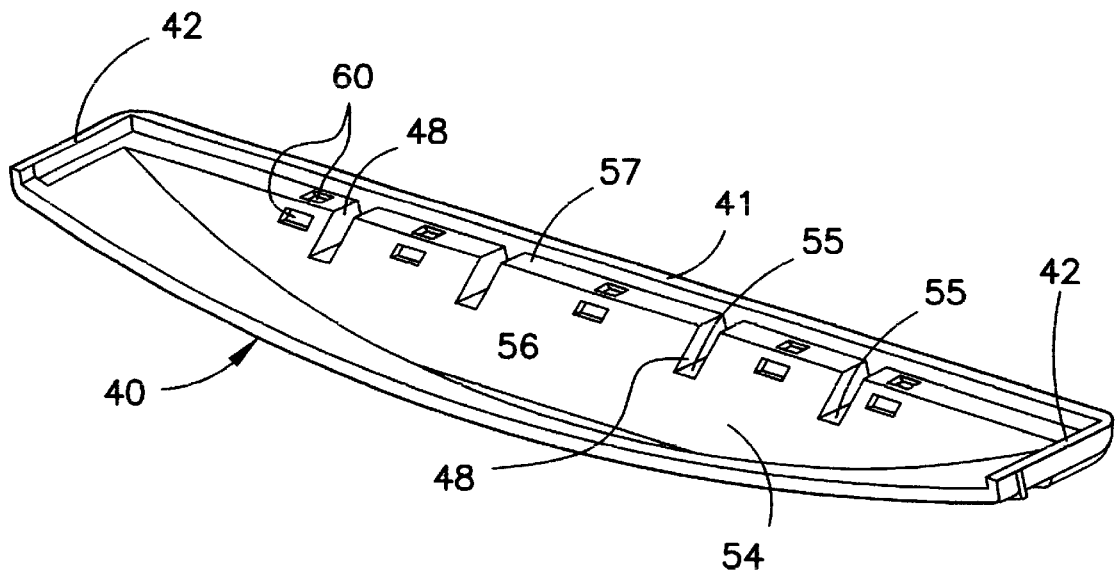
FIG. 5 is a bottom perspective view of the end cap illustrated in FIGS. 3 and 4.

As illustrated in FIGS. 4 and 5, the end cap 50 is generally open underneath the curved front surface. Thus, the rear edge 53 of the end cap generally follows the side-to-side contour of the curved front panel 43, or is upwardly curved relative to the common plane between the front and side edges. This side-to-side curvature corresponds to the shape of the bows 32 spanning the trailer opening 14.

In order to address one of the drawbacks of prior contoured end cap designs, the end cap 40 of the present invention includes a deflection barrier 54 formed at the inner surface of the curved panel 43. In the preferred embodiment, this deflection barrier 54 is a box-like structure in that it projects downward from the inner surface of the curved panel. More specifically, the barrier 54 includes an angled wall 56 terminating in a bottom wall 57 adjacent to the front edge 41. The angled wall 56 of the barrier 54 operates to deflect material downward and inward into the container or trailer 12. Thus, the deflection barrier 54 prevents the build-up of material within the end cap 50, a problem that plagues prior known end caps.

In the preferred embodiment, the deflection barrier 54 also defines a number of stiffening recesses or indentations 55 spaced along the length of the barrier. The stiffening indentations 55 include opposite transverse walls that add bending stiffness to the barrier. Most preferably, one transverse wall of each indentation 55 corresponds to a stiffening wall 48 that form one of the walls of the stiffening indentations 47 in the front curved panel 43.

In order to reduce the material requirements for and weight of the end cap 40, the end cap is hollow between the deflection barrier 54 and front panel 43. The end cap 40 can be formed with this hollow shape using conventional molding techniques, such as rotational molding. The stiffening indentations 47 in the front panel 43 and corresponding stiffening indentations 55 in the deflection barrier 54, and their associated transverse walls, make the end cap extremely strong and capable of resisting bending, buckling and twisting before and after installation. The sealing ridge 50 also adds stiffness to the front panel 43 to help the end cap resist impact loads.

In a specific embodiment, the deflection barrier defines a number of strap slots 60 therethrough. The slots 60 are provided to receive tie-down straps and hooks that are frequently utilized in hauling trailers. These strap slots 60 can be formed in the deflection barrier as part of the molding process, or can be cut in as needed after installation.

Figure 6:
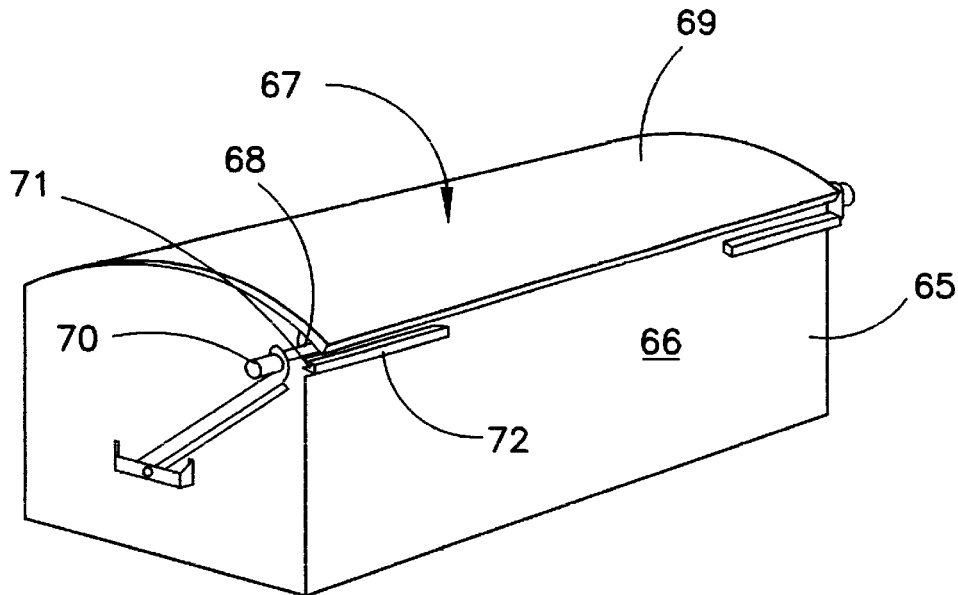
FIG. 6 is a perspective view of a trailer including a motorized roll tarping system of the prior art.
Figure 7:
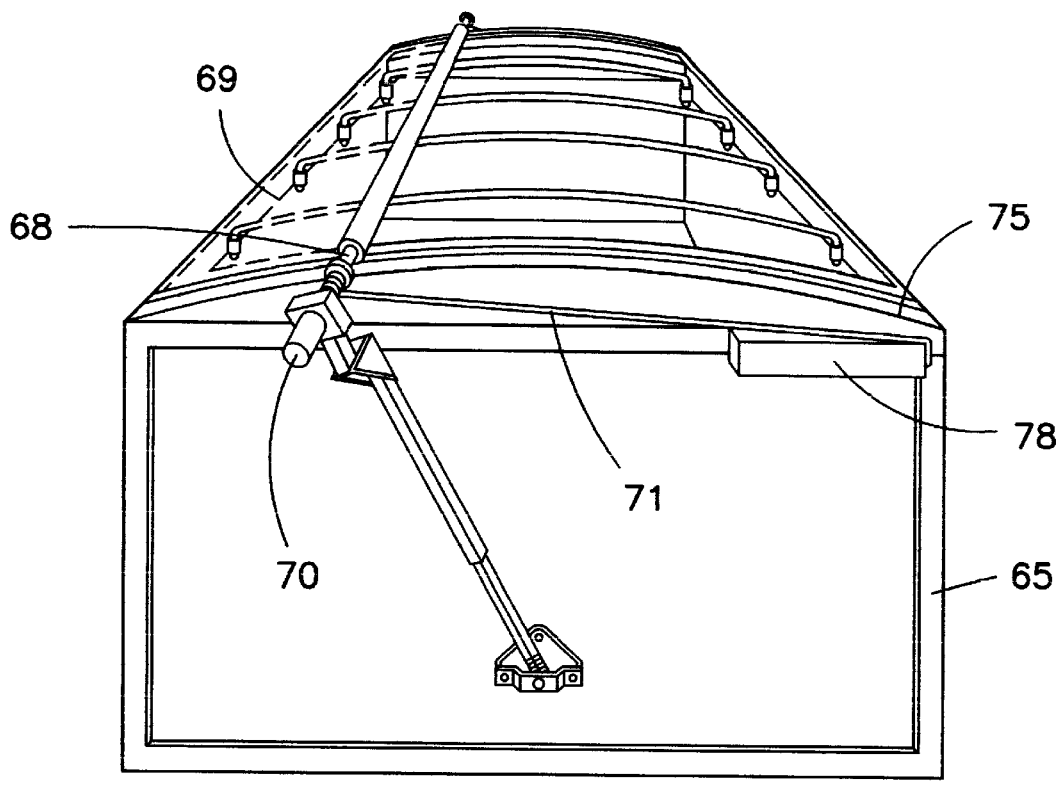
FIG. 7 is a rear perspective view of a trailer including an end cap in accordance with a further embodiment of the invention for use with a motorized roll tarping system.
Figure 8:
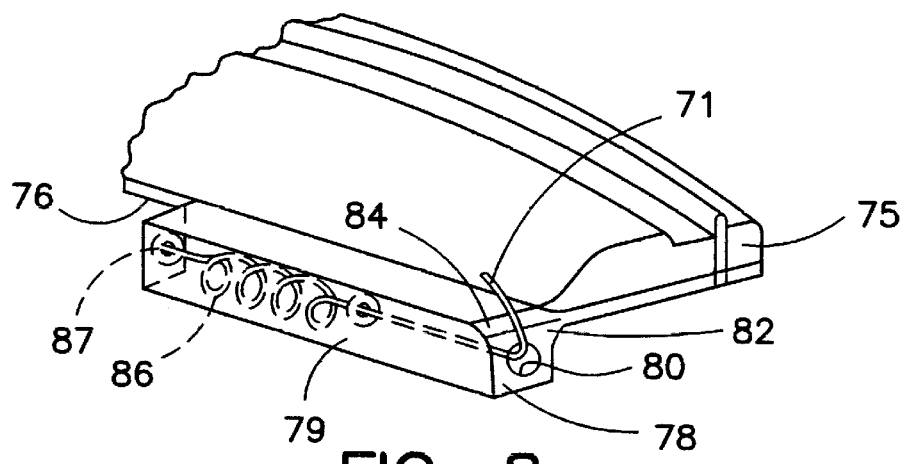
FIG. 8 is an enlarged partial view of an integral tension mechanism component of the end cap illustrated in FIG. 7.

Referring now to FIGS. 6–8, another aspect of the present invention will be described. A trailer 65 is illustrated with a motorized tarping system 67 mounted thereon. The tarping system 67 includes a tarp 69 wound onto and unwound from a roll tube 68. The tarp and roll tube can be similar to the same components in the previous embodiment. With this tarping system, however, a drive motor 70 is provided in lieu of the manual crank and crank shaft mechanism. The reversible drive motor 70 rotates the roll tube 68 to wind or unwind the tarp therefrom.

The tarping system 67 includes a return cable 71 connected to the drive motor or the roll tube that applies a force to assist in unwinding the tarp, or more specifically to pull the roll tube 68 toward the deployed position across the trailer 65. The return cable 71 is connected at its opposite end to a tension mechanism 72 mounted to a side wall 66 of the container or trailer 65. A tarping system of this type is more fully disclosed in the Michel '328 cited above, and the discussion of the motor-driven tarping system is incorporated herein by reference.

As disclosed in the Michel '328 patent, the tension mechanism 72 is a separate component from the remainder of the tarping system 67. In a typical installation, the mechanism 72 constitutes a tube having a tension spring mounted therein. The tube is usually made of metal and is mounted to the trailer side wall 66 by appropriate fasteners.

Of course, a prior art tension mechanism of this type must be mounted to the trailer independent of the other tarp components. It would be desirable to simplify the installation of a tarping system, such as by eliminating a multiplicity of components that must be individually mounted. In one feature of the present invention, a one-piece end cap 75 can be provided as illustrated in FIG. 7. The end cap 75 includes an integral tension mechanism 78 that is preferably molded as one-piece with an end cap having a configuration similar to the end cap 40 shown in FIGS. 3–5.

As shown in more detail in FIG. 8, the end cap 75 includes an elongated body 79 formed along the front edge 76 of the end cap. Preferably, the body 79 mates with the remainder of the end cap along a smooth junction 82. The elongated body 79 for the tension mechanism 78 is integrated with the end cap so that the body can be abutting the top rail of the container or trailer 65 when the end cap is mounted over the top rail. The end cap 75 can be mounted to the trailer in the same manner as the end cap 40, as described above. In addition, the elongated body 79 can be modified to accommodate fasteners, such as bolts, to connect the body to the trailer for added stability.

The elongated body 79 defines a closed ended bore 80, preferably situated so the opening of the bore projects outwardly and away from the drive motor 70. In this way, the tension cable 71 can be extended across substantially the entire width of the trailer 65, as can be appreciated from FIG. 7. With this arrangement, the cable 71 and tension mechanism 78 of the present invention can most closely emulate the performance of the tension mechanism 72 of the prior art system shown in FIG. 6.

Since the cable 71 is drawn back across the elongated body 79, the body preferably defines a contoured upper edge 84 to act as a bearing surface to reduce a possible source of friction as the cable is pulled back and forth across the body. The upper edge 84 can preferably be curved from the opening of the bore 80 to provide a smooth bearing surface on which the cable can ride.

The internal components of the tension mechanism 78 can be similar to the prior art mechanisms. For instance, the integral mechanism 78 of the present invention can include a tension spring 86 housed within the bore 80 of the body 79. One end of the spring 86 is connected to an end of the cable 71. The other end of the spring can be attached to the closed end of the body 79 using an appropriated fastener 87. For instance, the fastener 87 can be an eyebolt and nut passing through a small diameter opening in the closed end a of the body, akin to the fastener illustrated in the '328 Patent.

With this embodiment of the invention, a one-piece end cap 75 is provided that integrates the end cap and tarp sealing features of the end cap 40 described above, with a tension mechanism useful for motor-driven tarping systems. A single installation is all that is required to mount both components to the container or trailer. Like the end cap 40, the end cap 75 can be molded from plastic or fiberglass having the same strength and stiffness characteristics discussed above.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. An end cap for a tarping system mounted to a container, the tarping system having a flexible cover mounted on a rotatable roller and further having a drive mechanism for rotating the roller to deploy the flexible cover over the open top of the container, said end cap comprising:

a one-piece body having a front edge and opposite side edges, said edges configured to be mounted at one end of the container, said one-piece body including a front panel extending from said front edge to an opposite rear edge, said front panel defining a trough extending between said side edges and an upstanding ridge substantially co-extensive with said trough and disposed between said trough and said rear edge of said body, said trough sized to receive a side edge of the flexible cover therein when the cover is deployed over the open top of the container; and wherein said front panel defines a number of stiffening indentations.

2. The end cap for a tarping system according to claim 1, wherein:
   said front edge and said side edges reside within a common plane; and
   said rear edge is curved upwardly relative to said common plane between said side edges.

3. The end cap for a tarping system according to claim 2, wherein said front panel is curved from said rear edge to said front edge.

4. An end cap for a tarping system mounted to a container, the tarping system having a flexible cover mounted on a rotatable roller and further having a drive mechanism for deploying the flexible cover over the open top of the container, said end cap comprising:
   a body having a front edge and opposite side edges defining a common plane and configured to be mounted on one end of the container, said body further having a rear edge opposite said front edge, said rear edge being curved upwardly relative to said common plane between said opposite side edges and said front panel being curved from said rear edge to said front edge, said front panel including an inner surface facing said common plane; and
   a deflection barrier projecting from said inner surface of said front panel.

5. The end cap for a tarping system according to claim 4 wherein said deflection barrier is integrally formed with said front panel.

6. The end cap for a tarping system according to claim 5, wherein said deflection barrier is a hollow box-like structure.

7. The end cap for a tarping system according to claim 6, wherein said deflection barrier includes an angled wall extending from said inner surface of said front panel adjacent said rear edge and angled toward said front edge.

8. The end cap for a tarping system according to claim 7, wherein said deflection barrier includes a bottom wall spanning between said angled wall and said front edge of said body.

9. The end cap for a tarping system according to claim 7, wherein said angled wall defines a number of stiffening indentations.

10. The end cap for a tarping system according to claim 7, wherein said angled wall defines a number of slots sized to receive a strap therethrough.

11. An improvement for a tarping system mounted to a container, the tarping system having a flexible cover mounted on a rotatable roller and further having a drive mechanism to rotate the roller for deploying the flexible cover over the open top of the container, said improvement comprising:
   an end cap configured to be mounted at one end of the container and defining a surface for supporting the flexible cover when it is deployed over the open top of the container; and
   a tension mechanism attached to said end cap, said tension mechanism including:
      a cable connectable to the drive mechanism:
      a tensioning element operable to apply tension to said cable; and
      an elongated body defining a bore therethrough sized to receive said tensioning element therein, wherein said bore is open at one end and closed at an opposite end of said elongated body, said opposite end disposed facing the drive mechanism when the flexible cover is un-deployed.

12. The improvement for a tarping system according to claim 11 wherein:
   said end cap includes a front edge sized to fit on a front edge of the container; and
   said elongated body is attached to said end cap along said front edge.

13. The improvement for a tarping system according to claim 11, wherein said cable is connected to said tensioning element within said bore.

14. The improvement for a tarping system according to claim 13, wherein said elongated body includes a contoured edge at said one end configured to provide a bearing surface for said cable.

15. The improvement for a tarping system according to claim 11, wherein said elongated body is integrally formed with said end cap.

16. The improvement for a tarping system according to claim 15, wherein said elongated body and said end cap are formed of a molded plastic material.

* * * * *